United States Patent [19]

Huber et al.

[11] Patent Number: 4,538,384
[45] Date of Patent: Sep. 3, 1985

[54] METHOD FOR GRINDING OR CUTTING A WORKPIECE

[76] Inventors: Johann Huber, Nr. 373, A-6233 Kramsach; Otto Thanner, Innsbruckerstr. 45, 6130 Schwaz, both of Austria

[21] Appl. No.: 398,594

[22] Filed: Jul. 15, 1982

[30] Foreign Application Priority Data

Jul. 20, 1981 [AT] Austria .................................. 3190/81

[51] Int. Cl.³ .......................... B24B 1/00; B24B 55/02
[52] U.S. Cl. ......................................... 51/322; 51/267
[58] Field of Search ................. 51/266, 267, 322, 325, 51/281 R, 356

[56] References Cited

U.S. PATENT DOCUMENTS

| 193,306 | 7/1877 | White | 51/356 |
| 1,970,545 | 8/1934 | Chandler | 51/263 |
| 3,241,265 | 3/1966 | Wing | 51/431 |
| 3,990,192 | 11/1976 | Bonnice | 51/325 |
| 4,068,416 | 1/1978 | Bonnice | 51/263 |

FOREIGN PATENT DOCUMENTS

| 252251 | 10/1912 | Fed. Rep. of Germany. | |
| 2900409 | 7/1979 | Fed. Rep. of Germany | 51/266 |
| 837823 | 6/1981 | U.S.S.R. | 51/267 |

*Primary Examiner*—Roscoe V. Parker
*Attorney, Agent, or Firm*—McGlew and Tuttle

[57] ABSTRACT

During the grinding of a workpiece a body separate from the abrasive disk is fed to the zone of cutting and arranged therein. Said body is solid at room temperatures of between 1° C. and 200° C. and contains materials assisting the grinding process, such as cryolite, pyrite etc., or is formed by such materials.

8 Claims, 3 Drawing Figures

METHOD FOR GRINDING OR CUTTING A WORKPIECE

BACKGROUND OF THE INVENTION

1. Field of the Invention

The invention relates to a method and a device for grinding or cutting a workpiece, whereby a relative movement between the workpiece and the abrasive body, which consists of abrasive grain, binder material and fillers in some cases, takes place.

2. Description of the Prior Art

Abrasive bodies generally comprise three components. First, the cutting abrasive grain, which is, for example, corundum or silicon carbide, second, the binder material, which may be a resin but also a ceramic composition, and third, the filler.

The present invention exclusively relates to active fillers The effects of active fillers are commonly categorized into the following three major groups:

1. Decrease in the friction between abrasive grain, workpiece and chips, i.e. the fillers and their by-products must have the effect of high temperature lubricants or high pressure lubricants. They can thereby form a primary lubricating film of melted mass (e.g. cryolite) or a solid lubricating film (graphite, molybdenum sulfide, lead oxide). Secondary films may also be formed: metallic chloride (-sulfide) as a filler chlorine- (sulfur-) -separation metallic chloride (-sulfide) of the gound material.
2. Protective effect by forming primary or secondary surface films on the abrasive grain, workpiece and chips (analogous to item 1). Grain destruction due to diffusion processes (e.g. spinel formation when grinding iron material containing corundum), welding of the grit to the grain or to the workpiece are thereby avoided.
3. Cooling effects in the microrange due to height melting-, vaporization- and phase change temperatures and thermal phase change points which are favorable with respect to temperature.

Particularly active fillers are, for example, halegonides (e.g. lead chloride, fluorspar, cryolite etc.), chalegonides (e.g. pyrite, antimony sulfide, zinc sulfide, molybdenum sulfide selenides, tellurides etc.), low melting metals (e.g. lead, tin, low melting composition metals), or high pressure lubricants (e.g. graphite). In practice, lead chloride and antimony trisulfide have proved to the the best fillers with respect to service life and low temperature ("cool abrasion").

It has been found that a filler is more active the lower its phase change temperature (melting-, boiling-, sublimation-, decomposition point) is. Due to the processing conditions in the manufacture of abrasive articles, these temperatures cannot fall below a certain value. Moreover, chemically highly active elements or compounds, e.g. chlorine, hydrogen chloride, sulfur, sulfur dioxide etc., should be set free in the grinding process during decomposition.

The problem arising with active fillers is such that in many cases fillers which are highly interesting in grinding techniques, i.e. highly effective, cause problems in the manufacture of the disk. Examples in this respect are hygroscopic fillers, for example. It is further to be considered that only a restricted amount of active fillers can be used in the abrasive disk or abrasive article as the abrasive grain and the binder material must also form a certain minimum amount in the abrasive disk.

Apart from the addition of active and cooling substances, for example, it is known to cool abrasive disks during the grinding process by means of liquid cooling agents, e.g. oil-water emulsion. When grinding at elevated circumferential velocities, for example, the liquid cooling agent is sprayed onto the abrasive disk by means of nozzles.

SUMMARY OF THE INVENTION

It is the object of the invention to provide a method of the above-mentioned kind creating essential advantages in respect of the use of active materials.

According to the invention this is achieved by contacting a body with the abrasive article in the region of its working surface during the grinding or severing process, said body being formed by active materials or containing active fillers and being solid at temperatures of between 1° C. and 200° C.

It is a further object of the invention to provide a device for implementing the method according to the present invention.

According to the invention this is achieved by providing a magazine for the preferably plate-shaped solid body formed by active fillers or containing such, and intermittent forwarding means for intermittently feeding the solid body to the cutting zone.

The advantages of the method according to the invention are as follows:

1. The amount of the active materials (fillers in a conventional disk) becomes independent of the volume triangle, i.e. any desired amount of active filler can be used. The volume triangle comprises three components, abrasive grain, binder and filler, which make together 100% of the disk volume. This means that any increase in one of the components neccessarily results in a reduction in one of the other components. This interaction is obviated by means of the method according to the invention, as the amount of the active materials is no longer in direct volume-depending relationship to the other components or actual components of the abrasive body.

It must be considered that the method according to the invention allows that the abrasive article contains no active fillers, i.e. it contains only abrasive grain and binder or abrasive grain, binder and inactive fillers, and that the active materials are applied at the zone of grinding entirely by the solid body. Further, the abrasive article may also contain a certain amount of active fillers, whereby an additional amount of active fillers is available through the solid body.

2. The mixing- and moulding problems occurring in the manufacture of abrasive disks are reduced by bonds containing low amounts or no fillers at all.

3. The manufacture of solid bodies of or containing active materials, e.g. in the form of plates, is very simple. The dimensional and hardness tolerances can be chosen within a wide range, and the use of cheap resins is possible.

4. Active liquids and hygroscopic fillers, i.e. active materials, can be encapsulated in porous bodies, which then form together a solid body.

It is advantageously provided that the solid body has the form of a plate.

This method is of particular interest in cutting-grinding processes, as the plate can be cut simultaneously with the workpiece and, hence, a predetermined constant amount of active materials can be applied to the zone of cutting.

The amount of the active material can, for example, be predetermined by the thickness of the plate.

It is further advantageously provided that the solid body, e.g. the plate, rests directly against the workpiece during the grinding process. The plate may, for example, be fastened to the workpiece by a separate clamping means.

A further advantageous embodiment provided that a solid body with at least one active material and a binder material and preferably a filler is used.

A suitable binder material for the solid body is an epoxy resin, for example.

A particularly effective embodiment of the invention provided that one or several of the following substances are used as an active material: pyrite, potassium chloride, ammonium chloride, cryolite.

According to the invention, it may further be provided that a solid body which has a tight honeycomb structure with active materials encapsulated in its pores is used. Active liquids or hygroscopically active materials can be introduced into a porous structure of this kind.

The tight honeycomb structure is preferably made of plastics, e.g. PVC, polyurethane etc.

In order to improve the self-sharpening effect of the abrasive article, a further embodiment of the invention provides that abrasive grain is admixed to the solid body.

It may further be advantageously provided that the solid body is moved to the zone of cutting through feeding means. The thickness of the solid body determines the dose of the active material.

Severing-grinding processes have yielded good results, when the thickness of the solid body to be cut by the abrasive article was equal to the breadth of the abrasive article.

BRIEF DESCRIPTION OF THE DRAWING

In the following embodiments of the invention will be described by means of the figures of the drawing.

DESCRIPTION OF THE PREFERRED EMBODIMENT

Figure 1:
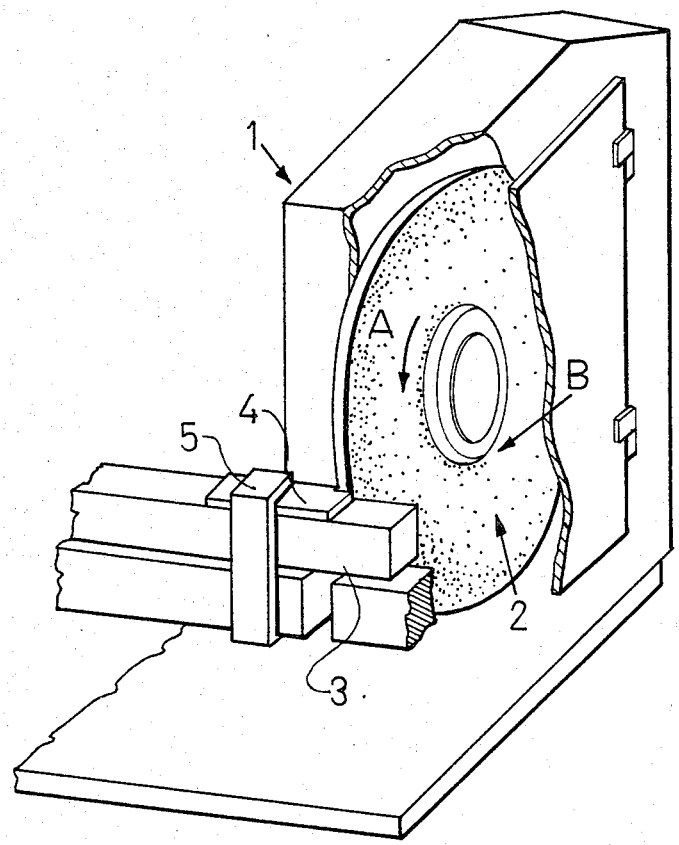
FIG. 1 shows a schematic view of an arrangement applied according to the method of the invention.

In the FIGS. 1 is a cutting machine onto which a cutting disk 2 is clamped. Dic 2 has a cutting surface. 3 is the workpiece to be cut at a cutting zone by the cutting surface of disk 2.

4 shows the solid body according to the invention, which is a plate and contains active, e.g. cooling, materials.

The solid body or plate 4 is fastened to the workpiece 3 through feeding means 5.

Arrows A and B show the direction of rotation and the feed direction of the cutting disk 2.

The workpiece 3 in contact with the plate 4 is cut by means of the cutting disk 2 in a conventional manner, whereby the plate 4 is cut simultaneously and, hence, active, e.g. cooling, materials are directly applied to the zone of cutting.

Figure 2:
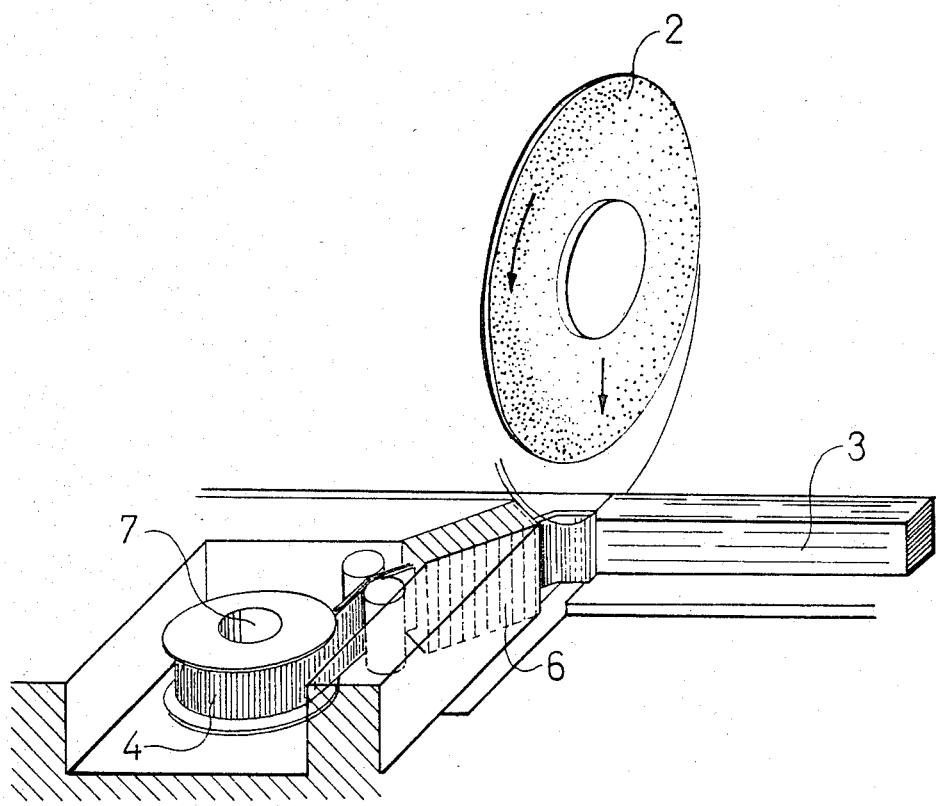
FIGS. 2 and 3 show schematic views of the device for carrying out the method according to the invention.
Figure 3:
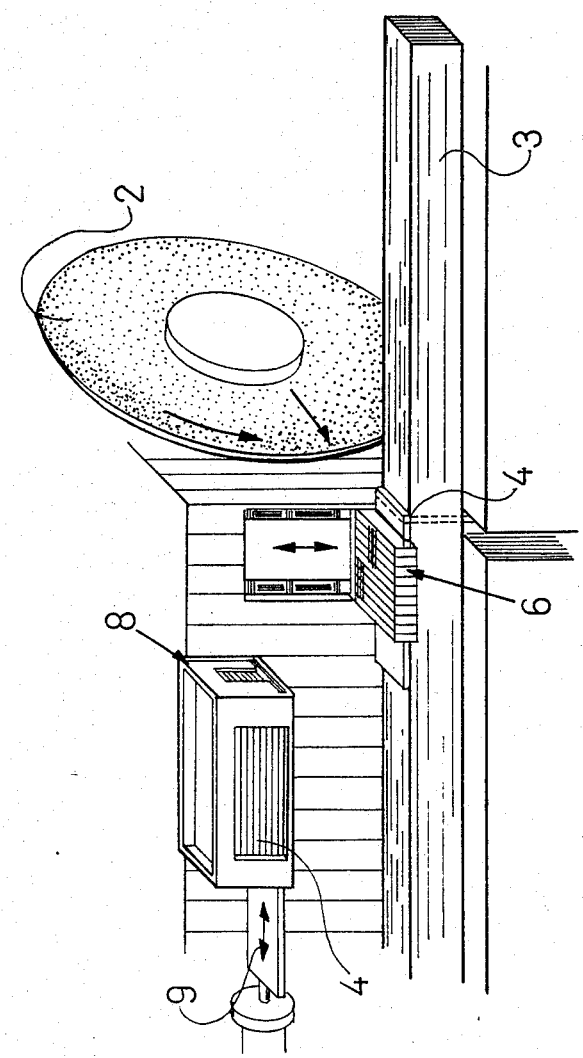

In FIGS. 2 and 3 the feeding means 6 are designed as intermittent forwarding means. In FIG. 2 the magazine is a reel 7 on which the solid body 4 is wound. The forwarding means draw the band of solid body 4 from the reel 7 to the workpiece 3 at an acute angle. Due to the arrangement of the forwarding means, the band of the solid body 4 is in the actual zone of cutting turned off parallel to the workpiece 3.

In the embodiment according to FIG. 3, the cooling plates of the solid body 4 are stored in a stack magazine 8. The forwarding means 6 are also vertically adjustable and control the forward feed of the cooling plate. When a cooling plate, i.e. a solid body, has been worn the forwarding means 6 move to the stack magazine 8 and take up a cooling plate pushed out by a slide 9. The forwarding means operate with two tongs, whereby one of said tongs effects the filting work in addition to clamping the solid body 4 of the cooling plates.

The following are recipes for the solid body as well as for the cutting disks which may be used in the method according to the invention:

| Solid Body: | | |
|---|---|---|
| Example 1 | Pyrite | 60% by volume |
| | Novolak (binder) | 40% by volume |
| Example 2 | Cryolite | 20% by volume |
| | Pyrite | 10% by volume |
| | Potassium chloride | 30% by volume |
| | Novolak (binder) | 40% by volume |
| Grinding disk: | | |
| | Ordinary Corundum | 45% by volume |
| | Resol, Novolak | 25% by volume |
| | Zinc sulfide | 10% by volume |
| | Glass fiber weave | 5% by volume |
| | Pores | 15% by volume |

Results of the severing-grinding process:

| Disk | Grinding ratio | Discoloration |
|---|---|---|
| 100% filler in the disk | 2,8 | clean cut |
| 100% filler used as cooling plate | 3,9 | clean cut |
| without "cooling plate" | 2,6 | Temperating colours over the entire severed surface |
| with "cooling plate" | 3,0 | clean cut |

What is claimed is:

1. A method of cutting a workpiece at a cutting zone using an abrasive cutting article having a cutting surface and made at least of abrasive grain and a binder, comprising:

applying an active solid body which is solid at a temperature between 1° C. and 200° C., into direct contact with the workpiece, with a portion of the active solid body lying adjacent the cutting zone of the workpiece, the active solid body being formed by active material or containing active fillers; and moving the cutting surface of the abrasive article past the portion of the active body and past the cutting zone for cutting the workpiece at its cutting zone and for utilizing the active solid body.

2. A method according to claim 1, including feeding the active solid body to a new cutting zone of a workpiece after the abrasive article has been moved to cut the workpiece.

3. A method according to claim 1, wherein said solid body is a plate.

4. A method according to claim 1, wherein the abrasive article cuts into said solid body during the cutting of the workpiece.

5. A method according to claim 1, wherein said solid body comprises at least an active material, a binder and a filler.

6. A method according to claim 5, wherein the binder used for said solid body is an epoxy resin.

7. A method according to claim 1, wherein at least one of the following substances are used as the active material: pyrite, potassium chloride, ammonium chloride, cryolite.

8. A method according to claim 4, wherein a thickness of said solid body to be cut by the abrasive article is equal to a breadth of said abrasive article.

* * * * *